UNITED STATES PATENT OFFICE.

CHARLES B. CARTER, OF LAWRENCE, MASSACHUSETTS.

PROCESS OF MAKING WOOD PULP.

SPECIFICATION forming part of Reissued Letters Patent No. 9,551, dated February 1, 1881.

Original No. 215,880, dated May 27, 1879. Application for reissue filed October 23, 1880.

*To all whom it may concern:*

Be it known that I, CHARLES B. CARTER, of Lawrence, of the county of Essex and State of Massachusetts, have invented a new and useful process of treating vegetable fibers or wood for the removal therefrom of matters detrimental to it for the conversion of it into pulp for the manufacture of paper; and I do hereby declare the same to be described as follows:

In the structural form of most, if not all, fibrous vegetable growths, such as woods, straw, cane, or grasses, there is a basis of the fiber which is called "cellulose," it being invested with or penetrated by an incrusting substance or substances. Such, with some soluble or mineral matters, compose the hydrated solid part of the wood or plant. I use in the manufacture of paper any wood or vegetable fiber of such composition, either after reduction of it by grinding or after so treating it and bleaching or otherwise preparing it. But the material used in the production of paper of the better qualities is nearly pure cellulose, the obtaining of which from wood, straw, cane, grasses, or other vegetable matters of like character depends on the removal or destruction of more or less of the incrusting substance or substances.

Previous to my invention it has been customary to obtain the cellulose from wood by first removing the bark therefrom, and next cutting the wood across the grain, so as to divide it into small fragments, which were next introduced into a rotary boiler and treated with caustic alkaline liquor and heat, the boiler being slowly rotated and the heating continued under high pressure in the boiler, usually from sixteen to twenty-two hours, until the most soluble parts of the wood were dissolved and the texture broken up. Under this treatment the caustic liquor becomes nearly, if not quite, neutralized by the acids formed, and a black tar-like substance is dissolved in it, so that it has no value, except that by costly evaporation and calcination it may be treated with lime and again causticized and evaporated, so as to fit it for a renewed action. In this way there is much loss of material, and the recovery of part of the alkali is expensive and generally more or less destructive to the apparatus. The wood that has been thus boiled in the caustic solution must be repeatedly washed and next ground, so as to divide the fibers and fit them for being bleached, which is the next step in the process. By so treating the fibrous material most of the incrusting substance is dissolved or destroyed, a portion of the cellulose or true fiber being likewise injured or destroyed, whereby the product becomes correspondingly diminished in quantity.

In the course of my experiments I have discovered that fibrous vegetable matter composed of cellulose and the incrusting substance or materials, when heated in a vessel which allows vapors to escape by a tube leading to the atmosphere or to a condenser, can be quickly and economically treated to separate the incrusting substance or matters from the cellulose without the presence of any liquid other than that incident to the wood. The incrusting substance I have found to be decomposed by a lower degree of heat than is cellulose, the constituent parts of such incrusting substance recombining and forming acetic acid and pyrogenic vapors, which may be condensed and utilized as a marketable product.

The wood, when treated by my process, is profoundly altered or changed from its normal condition, it being, after treatment, full of interstices and easily divided, and generally of a light cinnamon color. It thus becomes a new or improved manufacture for use in making paper-pulp. It is unlike wood which has been subjected to a destructive distillation to obtain from it pyroligneous acid, in which case the wood is charred or reduced to carbon, whereas by my process the wood or vegetable fiber is not charred or carbonized to render it unfit for being made into paper-pulp, the structure of the fiber being practically uninjured. After the wood may have been treated by my process and ground it is found to readily yield its coloring-matter to a cold and weak solution of alkali, and it may be bleached directly by a weak solution of hypochlorite of lime, (bleaching-powder,) in which case it will afford more white cellulose, comparatively speaking, than can be obtained from wood or fibrous matter when treated by caustic solutions, as hereinbefore mentioned.

By my process the wood is caused to yield from its contained water vapor or vapors. The heat being continued, the incrusting substance breaks up into volatile products, (not educts,) so that while applying what may be called "dry heat" to the material it is, during the process, exposed to vapors more or less dense, resulting from chemical changes induced by such heat, the external air being excluded from the retort or vessel containing the wood. In my improved process the pyrogenic compounds or matters set free by the heat act as vapors instead of liquids, and are discharged from the retort or vessel, leaving therein the wood or woody fiber deprived of its incrusting substance. These vapors, instead of being discharged into the atmosphere and lost, pass in the process of distillation from the retort into a condenser, and therein are condensed and converted into valuable acids and alcohols, the crude cellulose in the retort being neither alkaline nor acid.

My improved process for obtaining the cellulose existing in vegetable growths or wood consists in the following steps: The material or wood, in a properly-reduced state, is to be placed in a suitable retort or vessel provided with means of heating it to the necessary extent, such retort or vessel having an educt or devices for discharging and condensing the vapors induced in it, as may be necessary or convenient. On the retort being properly closed, heat is to be applied to it, so as to cause the charge to be subjected to the action of dry heat, and on the temperature reaching 215° Fahrenheit acid vapors, with the products composing the incrusting matter, will be evolved from the wood or material, which vapors should be allowed or caused to pass out of the retort by its educt. On the temperature being raised to from 450° Fahrenheit to 500° Fahrenheit and maintained a sufficient time, the wood or fibrous vegetable material will have been found to have been changed to the necessary extent or deprived of the fiber-incrusting matter. This having been accomplished, the fire may be withdrawn and the vessel or retort be allowed to cool, the wood or fibrous material being substantially removed from it, the escaping vapors having in the meantime been received by and condensed in the condenser.

Having thus described my invention, what I claim as new, and desire to secure by Letters Patent, in the distillation of fibrous vegetable matter, or having incrusting matters, as explained, is—

1. The method, substantially as described, of treating vegetable fibers or wood for removal therefrom of matters detrimental to the conversion of such wood or vegetable fibers into paper-pulp, the said method consisting in introducing the raw wood or material into a suitable vessel or retort, and while therein applying to it (the said wood or material) heat and the vapors expelled dry thereby from such wood or material, so as not only to partially or sufficiently decompose the wood or material, without in the meantime injuriously charring or carbonizing it, but to extract from it the said detrimental matter or matters and remove the same by the said vapor or vapors on such being allowed or caused to pass out of the vessel or retort through the educt thereof.

2. As a new or improved manufacture, the fibrous material, substantially as described, resulting from wood or vegetable fibers after treatment thereof, by means essentially as specified, so as to separate from such wood or vegetable fibers matters detrimental to the conversion of such into paper-pulp.

CHARLES B. CARTER.

Witnesses:
R. H. EDDY,
S. N. PIPER.

Correction of Reissue Letters Patent No. 9,551.

It is hereby certified that in Reissue Letters Patent No. 9,551, granted to Charles B. Carter, February 1, 1881, for an improved Process of Making Wood Pulp, on page 2 of the printed specification attached to and forming part of said Letters Patent an amendment consisting of the word "dry" was erroneously inserted after the word "expelled" in line 62, when the same should have been inserted before the word "heat" in the preceding line; that the proper corrections have been made in the files and records of the Patent Office, and are hereby made said Letters Patent.

Signed, countersigned, and sealed this 8th day of February, A. D. 1881.

[SEAL.]

A. BELL,
*Acting Secretary of the Interior.*

Countersigned:

E. M. MARBLE,
*Commissioner of Patents.*